US008214492B2

(12) United States Patent
Chauvin et al.

(10) Patent No.: US 8,214,492 B2
(45) Date of Patent: Jul. 3, 2012

(54) METHOD AND SYSTEM FOR ADAPTING A SESSION TIMEOUT PERIOD

(75) Inventors: Stephane Chauvin, Valbonne (FR); Gaetan Bzodek, Peymeinade (FR); Lea Guillon, Juan les Pins (FR); Jean Mouyade, La Roquette sur Siagne (FR)

(73) Assignee: Amadeus S.A.S., Sophia Antipolis (FR)

( * ) Notice: Subject to any disclaimer, the term of this patent is extended or adjusted under 35 U.S.C. 154(b) by 56 days.

(21) Appl. No.: 12/695,134

(22) Filed: Jan. 27, 2010

(65) Prior Publication Data

US 2011/0106940 A1  May 5, 2011

(30) Foreign Application Priority Data

Nov. 5, 2009  (EP) ..................................... 09306059

(51) Int. Cl.
G06F 15/173 (2006.01)
G06F 15/16 (2006.01)
G06F 11/00 (2006.01)
(52) U.S. Cl. ......................... 709/224; 709/203; 370/252
(58) Field of Classification Search .................... 709/224
See application file for complete search history.

(56) References Cited

U.S. PATENT DOCUMENTS

| 6,526,433 | B1 * | 2/2003 | Chang et al. .................. 709/201 |
| 7,493,394 | B2 * | 2/2009 | Zavalkovsky et al. ......... 709/225 |
| 7,764,969 | B2 * | 7/2010 | Ananthanarayanan et al. .............................. 455/458 |
| 7,873,994 | B1 * | 1/2011 | Wu ................................ 726/14 |
| 2006/0031553 | A1 * | 2/2006 | Kim ............................. 709/231 |
| 2006/0075110 | A1 * | 4/2006 | Seraphin ....................... 709/227 |
| 2006/0114498 | A1 * | 6/2006 | Yanagi et al. ................. 358/1.15 |
| 2007/0081547 | A1 | 4/2007 | Munje |
| 2007/0190963 | A1 * | 8/2007 | Ananthanarayanan et al. ........................... 455/343.1 |
| 2008/0062863 | A1 * | 3/2008 | Ginde ........................... 370/221 |

FOREIGN PATENT DOCUMENTS

| EP | 1 587 277 A2 | 10/2005 |
| JP | 2006-67507 A2 | 3/2006 |
| JP | 2006-146298 A2 | 6/2006 |
| WO | WO 2008/081322 A1 | 7/2008 |

OTHER PUBLICATIONS

Notification of Transmittal of the International Search Report and the Written Opinion of the International Searching Authority, or the Declaration for International Application No. PCT/EP2010/065220 (Dec. 8, 2010).
Extended European Search Report for European Application No. 09306059.8 (Apr. 8, 2010).

* cited by examiner

*Primary Examiner* — Peling Shaw
*Assistant Examiner* — Joiya Cloud
(74) *Attorney, Agent, or Firm* — Wood, Herron & Evans, LLP

(57) ABSTRACT

A method for adapting a session timeout period of an application comprising one or more parts, each part of the application having a corresponding predetermined session timeout period for receiving an input from a user connected to a part of the application, comprising the steps of determining the rate of timed out sessions for the part of the application after the number of connections to the part has reached a predetermined level; comparing the rate of timed out sessions of the part of the application with a predetermined threshold value of the rate of timed out sessions; adapting the predetermined session timeout period of that part (400) of the application based on the comparison to give rise to an adapted session timeout period.

11 Claims, 5 Drawing Sheets

METHOD AND SYSTEM FOR ADAPTING A SESSION TIMEOUT PERIOD

PRIORITY CLAIM

This application claims the benefit of European patent application no. EP 09306059.8 filed Nov. 5, 2009.

FIELD OF THE INVENTION

The present invention relates to a method and system for adapting a session timeout of a stateful client server application.

BACKGROUND OF THE INVENTION

Many users access specific websites on the Internet using a computer or mobile device connected to the Internet to request or buy products and/or services. Each of these websites is related to a corresponding server. A website can refer to a specific application i.e. booking a trip or voyage. The application generally comprises a sequence of successive parts such as pages. This means that each part appears after the user has completed the preceding part. These types of website use a predetermined session timeout period for the entire application only. This means that each part does not have a predetermined session timeout period, but each part uses the predetermined session timeout period defined at the application level. The session timeout period of the application is generally around 10 minutes. Thus, a user who connects to the website has 10 minutes to read the content of one part, fill in the requested data and submit the requested data to the application. During this time, the data the user has entered is stored temporarily on the server.

In the situation where the user has not finished a required step of the application within the session timeout period, the user is disconnected from the application and the stored data is lost. As a result, the user has to restart the application from the beginning and to re-enter all the data again. In order to avoid some of the disadvantages of this, some websites provide a pop-up window which automatically appears a few seconds before the session times out. The user is required to indicate that the current session of the application is kept opened by clicking on a specific button in the window. If the user always chooses to continue with the current session, the pop-up window will continue to appear again at a regular interval. As a result, the user has to continually confirm that the current session is kept open. The session timeout period does not adapt in any way to the time needed by individual users. The only result of the use of the pop-up window is that the duration of the session timeout period is extended each time the user requests the current session to continue.

An object of the present invention is to alleviate some of the problems associated with the prior art systems.

A further object of the present invention is to provide a method and system to dynamically adapt a session timeout of a stateful client server application.

SUMMARY OF THE INVENTION

According to one aspect of the present invention, there is provided a method for adapting a session timeout period of an application comprising one or more parts, each part of the application having a corresponding predetermined session timeout period for receiving an input from a user connected to a part of the application, comprising the steps of determining the rate of timed out sessions for the part of the application after the number of connections to the part has reached a predetermined level; comparing the rate of timed out sessions of the part of the application with a predetermined threshold value of the rate of timed out sessions; adapting the predetermined session timeout period of that part (400) of the application based on the comparison to give rise to an adapted session timeout period.

According to another aspect of the present invention, there is provided a system for adapting a session timeout period of an application comprising one or more parts, each part of the application having a corresponding predetermined session timeout period for receiving an input from a user connected to the application, the system comprises: a setting module for receiving the input from the user, wherein the input refers to a part (400) of the application; a statistics module for determining an adapted session timeout period for the part of the application and wherein the setting module sends the input to the statistics module for checking, retrieving and sending the predetermined session timeout period for the corresponding part to the setting module and wherein the setting module applies the retrieved predetermined session timeout period.

BRIEF DESCRIPTION OF THE DRAWINGS

Reference will now be made, by way of example, to the accompanying drawings, in which.

DETAILED DESCRIPTION OF THE EMBODIMENTS

Figure 1:
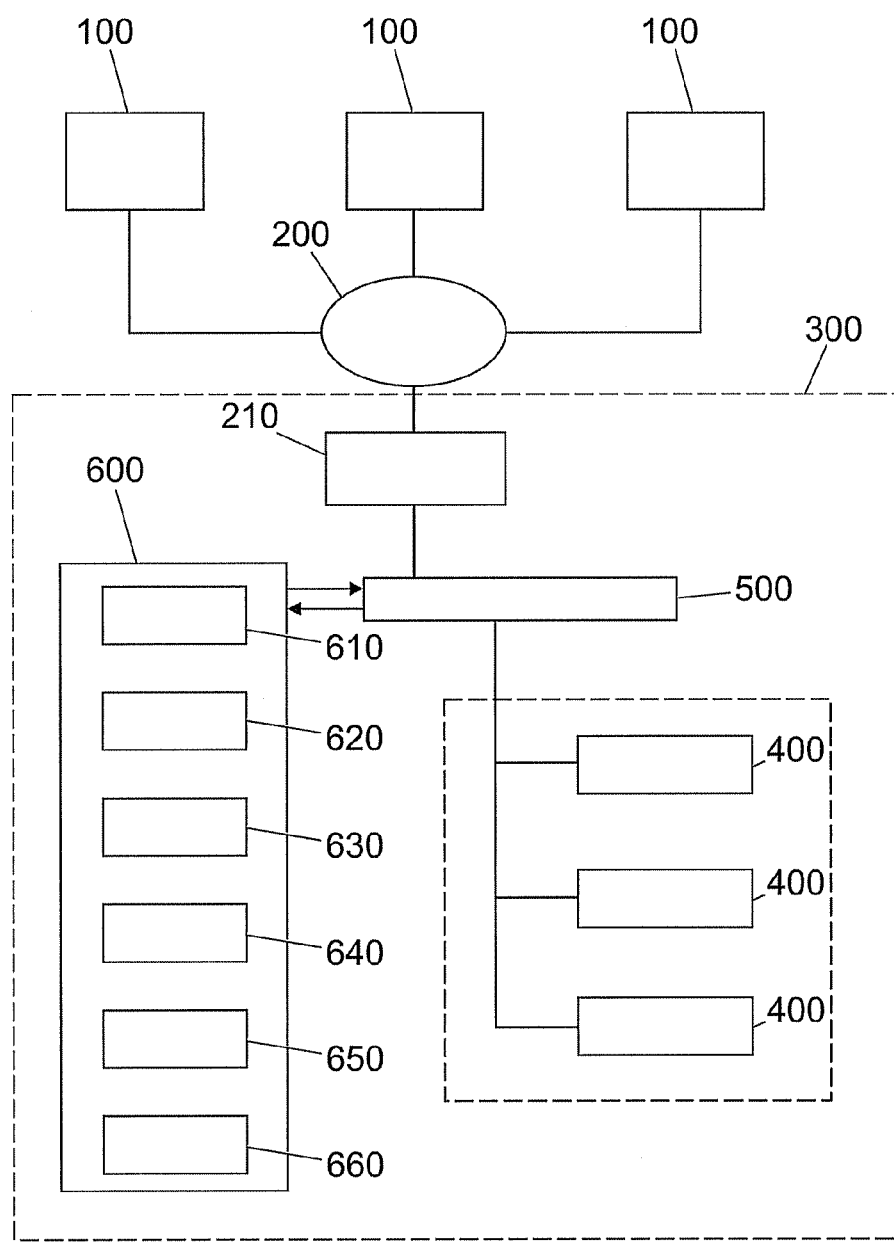
FIG. 1 is a block diagram showing three users connected to a specific website in accordance with an embodiment of the present invention.

FIG. 1 shows several electronic devices 100 such as computers, mobile devices including a personal digital assistant, a mobile phone, etc. Each device 100 is connected to a network 200 such as the Internet. As shown in FIG. 1, a server 210 is connected to the network 200. The server 210 refers to a specific website 300. The server 210 stores the sets of data of any users connected to the website 300. The website 300 is a website comprising a specific application. For example, the application may relate to a booking service provider for booking a hotel room or for buying an airline ticket. The application includes a succession of parts 400 such as pages. Differing from the prior art, each part 400 is associated with a corresponding predetermined session timeout period for the part. The predetermined session timeout period of each part 400 is within a predetermined interval between maximum and minimum predetermined session timeout periods of the part. The user always has to complete each part 400 in order to send a request through the network 200 and the server 210 to the website 300 to make the application move on to the next part of the application until the final part of the application is reached. The user may be required to enter specific fields such as name, address, departure location, arrival location, etc. In some parts it may be necessary to merely click on a specific button in order to validate specific information before accessing the next part for example agreeing the terms of a financial arrangement. The actions of the user in each part such as the validation of specific information or the entering of data in specific fields build a specific set of data per each user regarding the corresponding application. The user has to effect the actions in a part during the predetermined session timeout period of the part. Otherwise, the session of the user times out.

Referring to FIG. 1, the website 300 also comprises a setting module 500 and a statistics module 600. The setting module 500 receives one or more requests from one or more user devices 100 through the server 210. The setting module 500 also sends the requests to the statistics module 600. The statistics module 600 comprises several sub-modules in order to provide a calculation method that adapts the predetermined session timeout period of each part 400 based on each user's behaviour. The statistics module 600 comprises a connection module 610 to count the number of connections to the website e.g. the number of users having already entered data or having validated information on the website in a specific part 400 of the application. The connection module 610 carries out a regular check to determine the number of user connections already achieved for the application. As a result, for each check, the connection module 610 counts the number of connections to the website compared to the last check. The statistics module 600 also comprises a first comparison module 620. Each time the connection module 610 determines a number of connections, the first comparison module 620 compares the number of connections with a predetermined number of connections. If the number of user connections reaches the predetermined number of connections i.e. a predetermined level, the calculation method can begin. The predetermined level can be for example between 5000 to 15000 users which have connected to the website and processed a part 400 of the application since the last check.

The statistics module 600 also comprises a calculation module 630 to count the number of timed out sessions for a specific part 400 i.e. to count the number of users who did not complete the part during the predetermined session timeout period of the part 400. The session timeout period of a timed out session for a part 400 is taken into account only if the session timeout period is within the period of time defined by the minimum and the maximum predetermined session timeout periods for the part 400. Otherwise, the session timeout period is excluded. The calculation module 630 determines the number of timed out sessions based on the following process for example. In an application, each part 400 can be identified with a specific name such as part 1 (P1), part 2 (P2), part 3 (P3), etc. The calculation module 630 detects the time T1 of the display of a specific part to the user, for example P1 and the time T2 of the same user requesting the display of the next part, for example P2, to commences data entry in P2. The calculation module 630 then calculates a user working time period T2−T1 which the user has spent on the part P1. The calculation module 630 has to determine the user working time period spent for each user relating to each part 400. As a result, the calculation module 630 determines the number of timed out sessions by calculating the number of user working time periods which are above the predetermined session timeout period for the part 400. Then the calculation module 630 determines a corresponding rate i.e. the percentage of timed out sessions for the part 400 by dividing the number of timed out sessions by the predetermined number of connections.

The statistics module 600 further comprises a second comparison module 640 to compare the rate of timed out sessions for a specific part 400 with a predetermined threshold value. This value represents a satisfactory level of timed out sessions for the part 400. The predetermined threshold value can represent a level of around 3% to 8% of the predetermined number of connections for example. The statistics module 600 also comprises an adaptation module 650 to adapt the duration of the predetermined session timeout period of a part 400. If the result of the comparison indicates that the rate of timed out sessions is below the predetermined threshold value, this means that the session timeout period of the part should be adapted to be shorter. Thus, the adaptation module 650 can reduce the predetermined session timeout period for the part 400 by removing a predetermined period of time such as 1 to 3 seconds. If the result of the comparison indicates that the rate of timed out session periods is above the predetermined threshold value, this means that the session timeout period should be adapted to be longer. Thus, the adaptation module 650 increases the predetermined session timeout period for the part 400 by adding a predetermined period of time such as about 1 to 3 seconds. The predetermined period of time to add to a session timeout period for a part may be different from one part 400 to another.

The statistics module 600 includes a storage module 660 such as a database or a file to store the adapted session timeout period for the corresponding part of the application. As a result, in the storage module 660, any adapted session timeout period replaces the previous corresponding predetermined session timeout period for that part.

The server 210 stores the data entered during the predetermined session timeout period of the part 400 or during the adapted session timeout period of the part 400. The server 210 does not keep any data relating to a timed out session.

Figure 2:
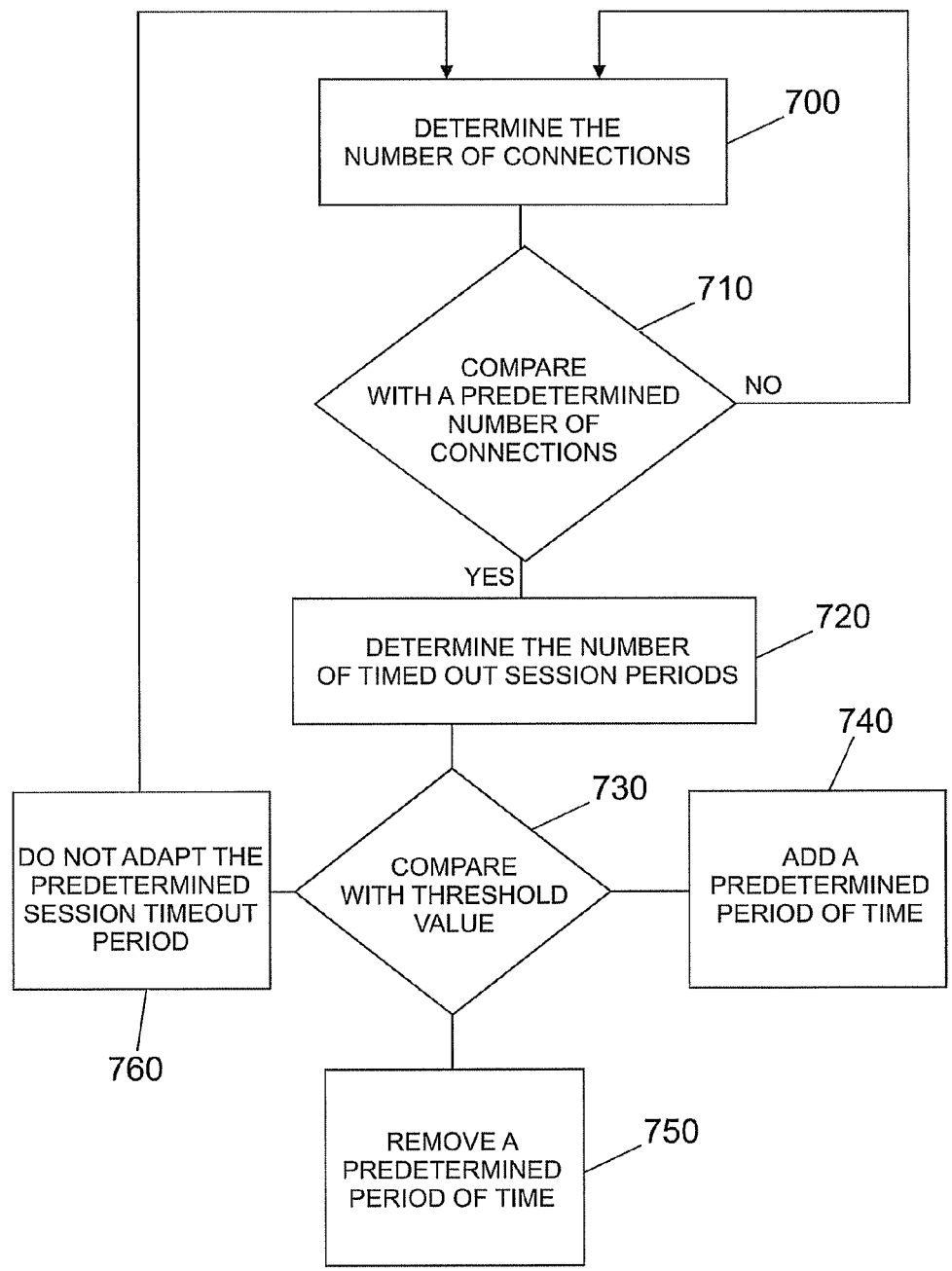
FIG. 2 is a flow chart of the method steps for adapting a session timeout period, in accordance with an embodiment of the present invention.

The method of the present invention comprises the following steps in order to determine if a predetermined timeout session period has to be changed based on previous user behaviour. As shown in FIG. 2, in step 700, the connection module 610 has to determine or identify the number of users having displayed a specific part 400 since a previous determination of that number of users. The connection module 610 only takes into account the number of users connected during a session timeout period of a part 400 where the session timeout period is within a predetermined interval between a minimum session timeout period and a maximum session timeout period.

In step 710, the first comparison module 620 compares the identified number of users with a predetermined number of connections. If the identified number of users does not reach the predetermined number of connections (NO), the connection module 610 regularly determines the number of users connected to the application until the first comparison module 620 determines that the identified number has reached the predetermined number of connections. When the predetermined number of connections is reached (YES), in step 720, the calculation module 630 has to determine the number of timed out session periods among the identified number of connections. In step 730, the second comparison module 640 compares the rate of timed out sessions for a part 400 with a predetermined threshold value of the rate of timed out sessions periods for the part 400. If the rate of timed out sessions is above the predetermined threshold value, it is assumed that the users did not have enough time to process the part 400 during the predetermined session timeout period of the part 400. As a result, in step 740 the adaptation module 650 adds a predetermined period of time to the predetermined session timeout period of the part 400. Such an addition provides an increased session timeout period for the part 400 for the next users. If the rate of timed out sessions is below the predetermined threshold value, it is assumed that the predetermined session timeout period of the part 400 is too long for the part 400. As a result, in step 750, the adaptation module 650 removes a predetermined period of time from the predetermined session timeout period of the part 400. Such a removal or subtraction provides a reduced session timeout period to the part 400 for the next users. This subtraction of time also increases the possibility of having more users being able to connect to the application as the time spent on the part is shorter than the previous predetermined session timeout. As such, the server 210 can store more data from other users as a set of data is stored during a shorter period of time.

If the rate of timed out sessions is equal to the predetermined threshold value, it is assumed that the predetermined session timeout period is correct. As a result, the predetermined session timeout period does not need to be adapted as shown in step 760. The process then goes back to step 700 for a further determination of the number of connections.

Figure 3:
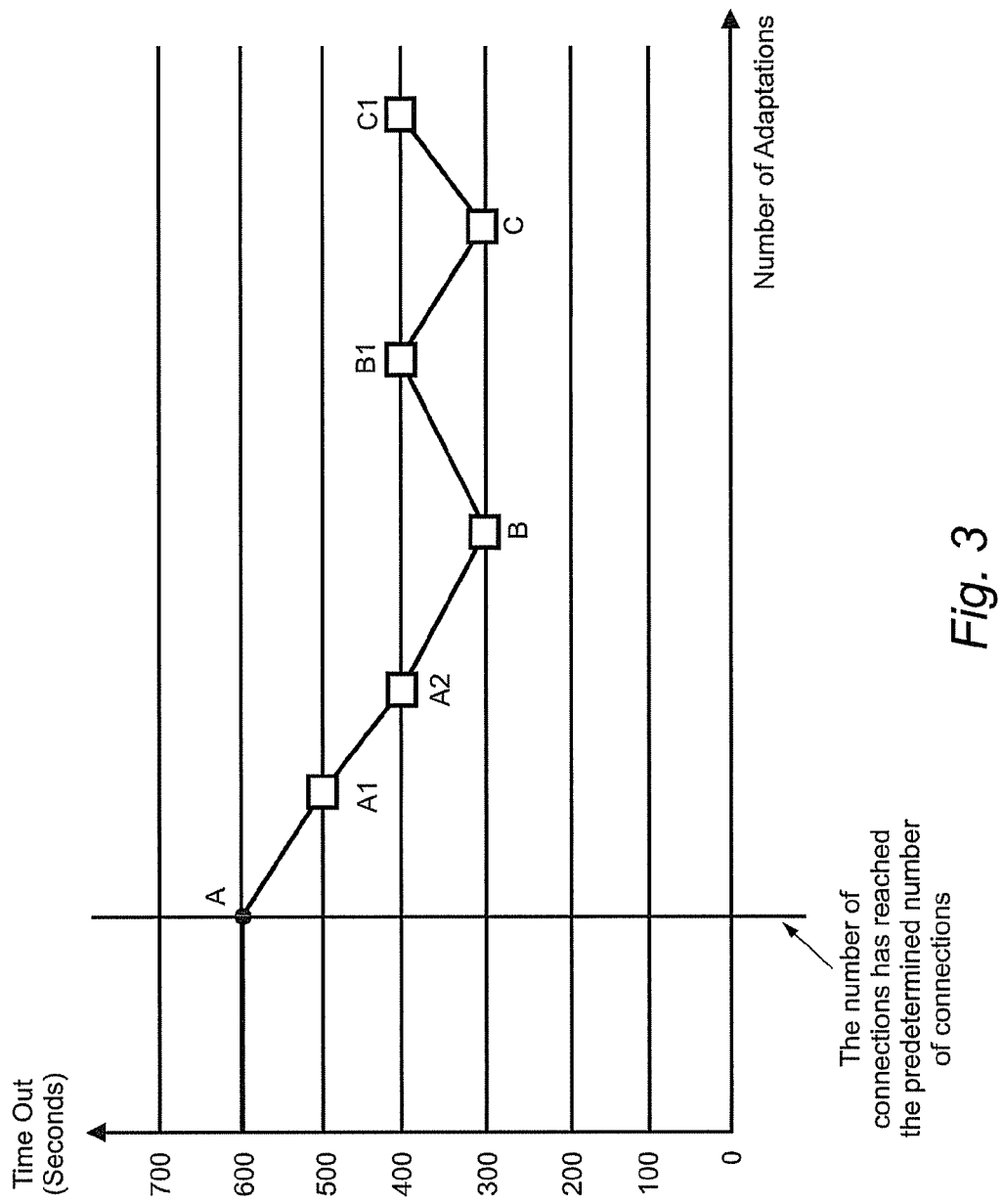
FIG. 3 is a graph representing an adaptation process of a session timeout period, in accordance with an embodiment of the present invention.

The method may operate as shown in FIG. 3 regarding a specific part of an application, where the predetermined minimum session timeout period of the part 400 is set to 200 seconds, the predetermined maximum session timeout period of the part 400 is set to 700 seconds and the predetermined session timeout period is set at 600 seconds. Also, the predetermined value of the number of user connections is set to 8000, the predetermined threshold value of timed out sessions periods for the part is set to 4%, i.e. 320 timed out session periods, and the predetermined period of time to add or to remove is 100 seconds.

As shown in FIG. 3, as soon as the first comparison module 620 identifies the number of connections has reached the predetermined number of connections, the adaptation process occurs. At point A, the second comparison module 640 compares the identified rate of timed out sessions with the threshold value of timed out sessions. On the basis that the identified rate of timed out sessions at point A is below the threshold value of timed out sessions, the adaptation module 650 removes the predetermined period of time of 100 seconds from the predetermined session timeout period of 600 seconds of the part 400 and the adapted predetermined session timeout period has a value of 500 seconds as indicated at point A1. The adaptation process occurs each time the number of connections reaches the predetermined number of connections.

In FIG. 3, the second adaptation results in adapting the session timeout period of the part by removing another predetermined period of time of 100 seconds from the previous adapted predetermined session timeout period of 500 seconds of the part 400 to reach another adapted predetermined session timeout period value of 400 seconds as indicated at point A2. Other adaptations as indicated with points B, B1, C and C1 may also occur. Regarding point B, the adaptation process comprises an addition of a predetermined period of time to the previous adapted predetermined period of time to reach another adapted predetermined time out value as indicated at point B1. The same applies regarding point C where the adaptation process results in adapting the previous predetermined session timeout period of the part at point C by adding a predetermined period of time to reach another part time out value as indicated at point C1.

Figure 4:
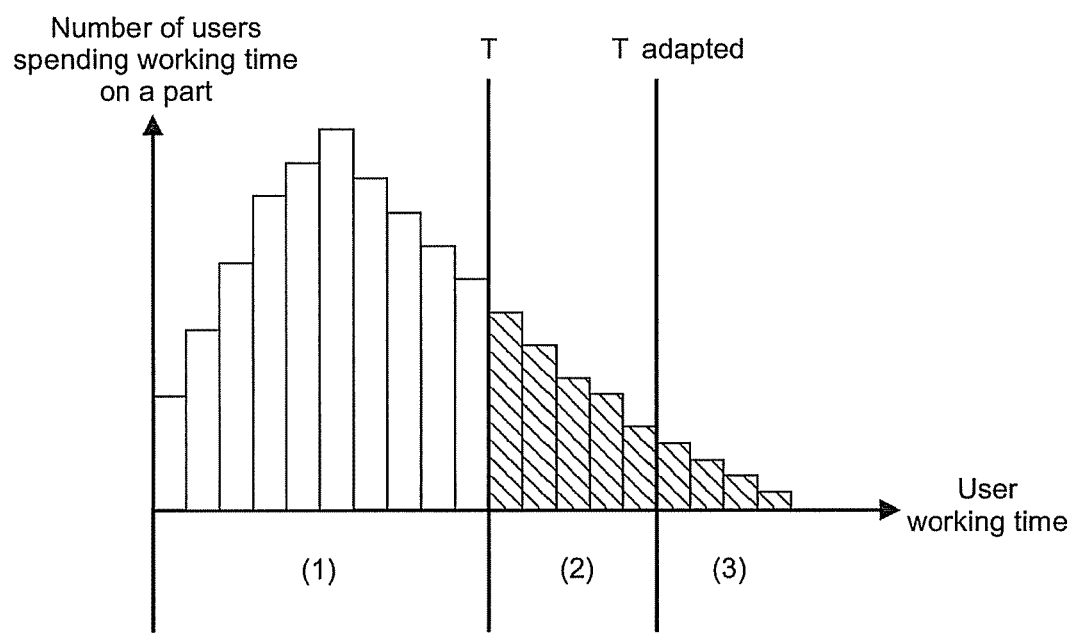
FIG. 4 is a graph representing an adaptation of a session timeout period for a specific part, in accordance with an embodiment of the present invention.

FIG. 4 shows an example of adaptations for a session timeout period of a specific part 400. The area (1) relates to the predetermined session timeout period and refers to the number of users having a working time lower than the predetermined session timeout period as indicated by the vertical line T. This means that these users did not need all the predetermined session timeout period to view a specific part 400 and fill in the required data. The area (2) on the right located after the mine T refers to users for which the session timed out as they required more working time than the predetermined session timeout period for the part 400. The second line T adapted shows an adaptation of the predetermined session timeout period for the part 400 by adding a predetermined period of time to the predetermined session timeout period of the part 400. This adaptation reduces the area (3) located on the right after the vertical line T adapted and therefore reduces the number of timed out sessions.

Figure 5:
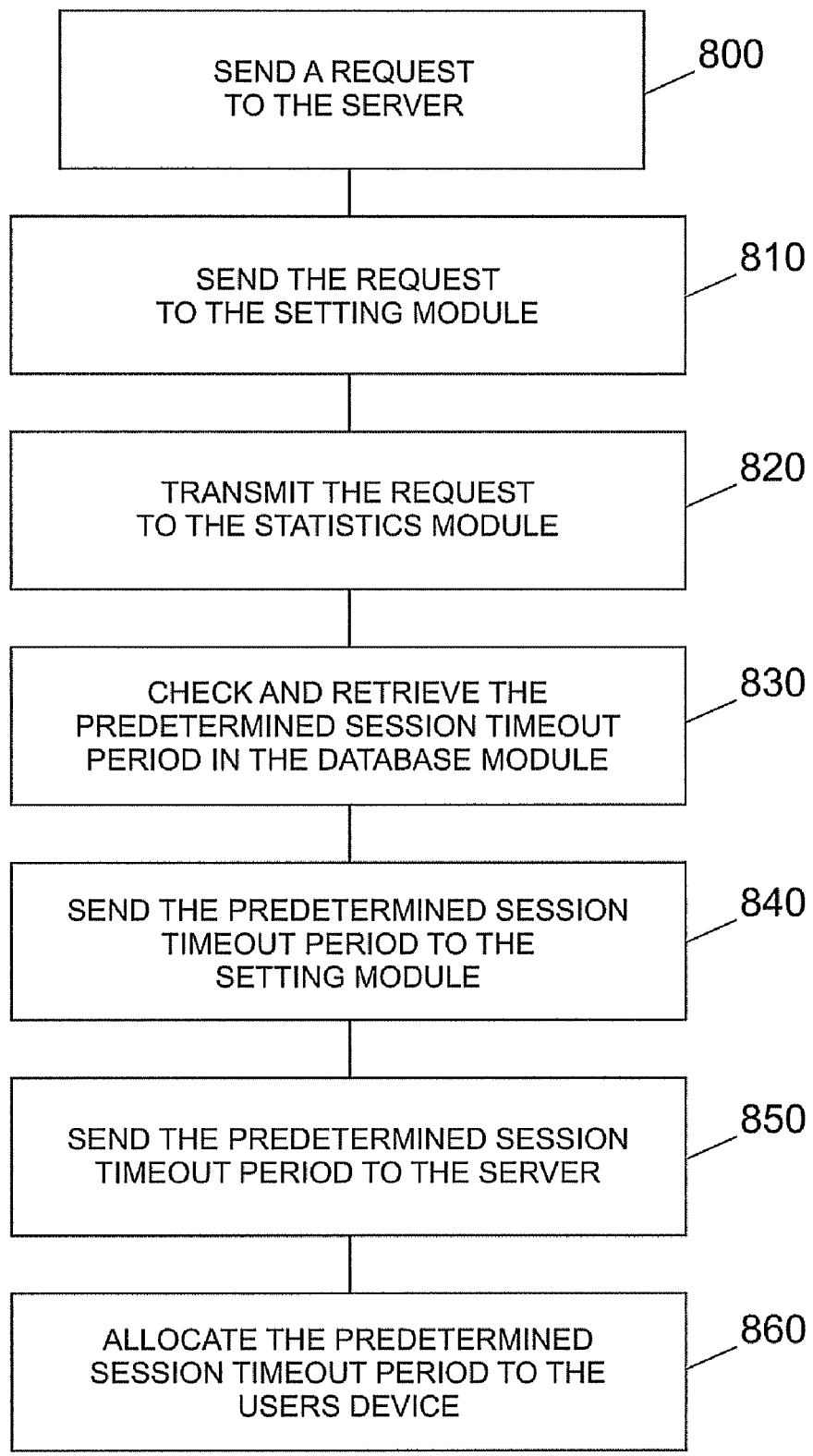
FIG. 5 is a flow chart of the method steps for adapting a session timeout period in accordance with an embodiment of the present invention.

In order to update the corresponding predetermined session timeout period for the corresponding part, the method as shown in FIG. 2 continues with the following steps as described with reference to FIG. 5. In step 800, a user device 100 sends a request to the server 210 relating to a specific part 400 of the application. In step 810, the server 210 sends the request to the setting module 500. In step 820, the setting module 500 transmits the request to the statistics module 600. In step 830, the storage module 660 checks and retrieves the corresponding predetermined session timeout period for the corresponding part 400. In step 840, the statistics module 600 sends the retrieved predetermined session timeout period back to the setting module 500. In step 850, the setting module 500 sends the retrieved predetermined session timeout associated with the specific part 400 back to the server. In step 860, the server allocates the retrieved predetermined session timeout for the specific part 400 to the user device 100.

Such a method provides a dynamic and permanent adaptation process for all the part of one or more applications. The session timeout periods of each part 400 of an application are analyzed for all the users in order to consequently update and adapt the predetermined value of the predetermined session timeout periods. As a result, the session timeout period is adapted based on the user behaviour.

A person skilled in the art will understand that some or all of the functional entities as well as the processes themselves may be embodied in software, or one or more software-enabled modules and/or devices.

What is claimed is:

1. A method for adapting a session timeout period of an application comprising one or more parts, each of the one or more parts of the application having a corresponding predetermined session timeout period for receiving an input from a user connected to one of the one or more parts of the application, comprising the steps of:

determining via the computer the rate of timed out sessions for the said one of the one or more parts of the application after the number of connections to said one of the one or more parts has reached a predetermined level to produce a determined rate of timed out sessions, wherein determining the rate of timed out sessions includes counting a number of sessions for which a time period from display of a specific part of the application to a user to the user requesting display of a next part of the application to the user exceeds the predetermined session timeout period;

comparing via the computer the determined rate of timed out sessions of said one of the one of more parts of the application with a predetermined threshold value of the rate of timed out sessions; and adapting via the computer the predetermined session timeout period of said one of the one or more parts of the application based on the comparison to give rise to an adapted session timeout period, wherein the step of adapting the predetermined session timeout period comprises respectively increasing or reducing the predetermined session timeout period by respectively adding or removing a predetermined period of time to or from the predetermined session timeout period if the determined rate of timed out sessions is respectively above or below the predetermined threshold value and thereby increasing or decreasing the time period for users to request display of the next part of the application after display of the specific part of the application.

2. A method as claimed in claim 1, further comprising the step of repeating via the computer at a predetermined interval the steps of determining; comparing and adapting for providing an updated adapted session timeout period.

3. A method as claimed in claim 1, wherein the method further comprises the step of replacing via the computer the predetermined session timeout period with the adapted session timeout period.

4. A system for adapting a session timeout period of an application comprising one or more parts, each of the one or more parts of the application having a corresponding predetermined session timeout period for receiving an input from a user connected to the application, the system comprises:

a computer processor coupled to a non-transitory computer readable storage medium;

a setting module for receiving the input from the user, wherein the input refers to one of the one or more parts of the application;

a statistics module for determining an adapted session timeout period for said one of the one or more parts of the application, wherein the statistics module comprises a calculation module to determine a rate of timed out sessions for the one or more parts, wherein determining the rate of timed out sessions includes counting a number of sessions for which a time period from display of a specific part of the application to a user to the user requesting display of a next part of the application to the user exceeds the predetermined session timeout period;

and wherein the setting module sends the input to the statistics module for comparing the determined rate of timed out sessions with a predetermined threshold value of the rate of timed out sessions and for adapting the predetermined session timeout period by respectively increasing or reducing the predetermined session timeout period by respectively adding or removing a predetermined period of time to or from the predetermined session timeout period if the determined rate of timed out sessions is respectively above or below the predetermined threshold value and thereby increasing or decreasing the time period for users to request display of the next part of the application after display of the specific part of the application.

5. A system as claimed in claim 4, wherein the statistics module further comprises a connection module to count the number of connections to said one of the one or more parts of the application.

6. A system as claimed in claim 4, wherein the statistics module further comprises a first comparison module to determine whether the number of connections to said one of the one or more parts of the application has reached a predetermined level.

7. A system as claimed in claim 4, wherein the statistics module further comprises a calculation module to count the rate of timed out sessions for said one of the one or more parts.

8. A system as claimed in claim 4, wherein the statistics module further comprises a second comparison module for comparing the rate of timed out session periods of said one of the one or more parts of the application with a predetermined threshold value of the rate of timed out sessions.

9. A system as claimed in claim 4, wherein the statistics module further comprises an adaptation module to adapt the predetermined session timeout period to define a corresponding adapted session timeout period for said one of the one or more parts.

10. A system as claimed in claim 4, wherein the statistics module further comprises a storage module for storing the adapted session timeout period.

11. A non-transitory computer readable medium having stored thereon a computer program comprising instructions for carrying out steps for adapting a session timeout period of an application comprising one or more parts, each of the one or more parts of the application having a corresponding predetermined session timeout period for receiving an input from a user connected to one of the one or more parts of the application, comprising the steps of:

determining the rate of timed out sessions for said one of the one or more parts of the application after the number of connections to said one of the one or more parts has reached a predetermined level to produce a determined rate of timed out sessions, wherein determining the rate of timed out sessions includes counting a number of sessions for which a time period from display of a specific part of the application to a user to the user requesting display of a next part of the application to the user exceeds the predetermined session timeout period;

comparing the determined rate of timed out sessions of said one of the one or more parts of the application with a predetermined threshold value of the rate of timed out sessions; and adapting the predetermined session timeout period of said one of the one or more parts of the application based on the comparison to give rise to an adapted session timeout period, wherein the step of adapting the predetermined session timeout period comprises respectively increasing or reducing the predetermined session timeout by respectively adding or removing a predetermined period of time to or from the predetermined session timeout period if the determined rate of timed out sessions is respectively above or below the predetermined threshold value and thereby increasing or decreasing the time period for users to request display of the next part of the application after display of the specific part of the application.

* * * * *